United States Patent [19]

Celommi

[11] 4,146,253
[45] Mar. 27, 1979

[54] PRESSURE COMPENSATED EXPANSION JOINT

[75] Inventor: Romeo A. Celommi, Newtown Square, Pa.

[73] Assignee: Yarway Corporation, Blue Bell, Pa.

[21] Appl. No.: 897,679

[22] Filed: Apr. 19, 1978

[51] Int. Cl.² ............................................. F16L 27/12
[52] U.S. Cl. ....................................... 285/95; 285/96; 285/302; 285/DIG. 1
[58] Field of Search ................... 285/DIG. 1, 95, 106, 285/302, 297, 96

[56] References Cited

U.S. PATENT DOCUMENTS

| | | | |
|---|---|---|---|
| 686,598 | 11/1901 | Evans | 285/302 |
| 1,513,315 | 10/1924 | Cook | 285/302 |
| 2,319,543 | 5/1943 | Hall | 285/302 X |
| 3,427,051 | 2/1969 | White et al. | 285/95 X |
| 3,434,743 | 3/1969 | Boeker | 285/297 X |
| 3,475,041 | 10/1969 | Mesko | 285/95 |
| 3,605,563 | 9/1971 | Parrett | 285/302 X |

*Primary Examiner*—Thomas F. Callaghan
*Attorney, Agent, or Firm*—John W. Logan, Jr.

[57] ABSTRACT

The preferred embodiment of the invention disclosed herein includes a first sleeve member having a slightly enlarged diameter portion at one end thereof and a second sleeve member having one end telescopically received within the enlarged diameter portion such that said first and second sleeve members are movable between expanded and contracted positions. Also included is a third sleeve member fixed to the outer surface of the second sleeve member and extending axially about the enlarged diameter portion and a portion of the smaller diameter portion of the first sleeve member. The third sleeve member is radially spaced from the first sleeve member forming a pressure chamber which communicates with the interior of said sleeve members through ports formed in the enlarged diameter portion. Thus, fluid pressure acts in the pressure chamber to counteract separation forces in an associated pipeline. First packing means is carried on the end of the third sleeve member adjacent the first sleeve member and is in sealing engagement therewith; second packing means is carried on the free end of the enlarged diameter portion between the second and third sleeve members and is in sealing engagement therewith. The second packing means includes a gland and an elongated filler tube extending from the gland between the second and third sleeve members and terminates beyond the third sleeve member whereby it is accessible and the second packing means can be repacked without dismantling the joint assembly or interrupting the flow of fluid in the associated pipeline.

6 Claims, 3 Drawing Figures

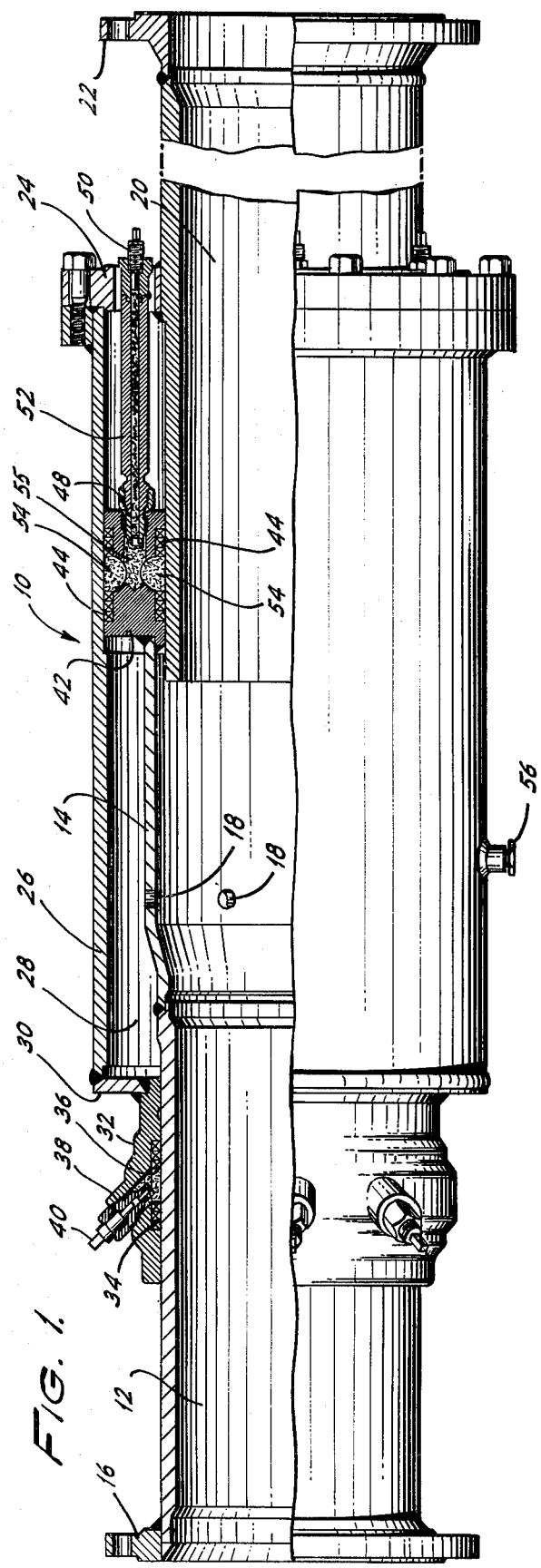
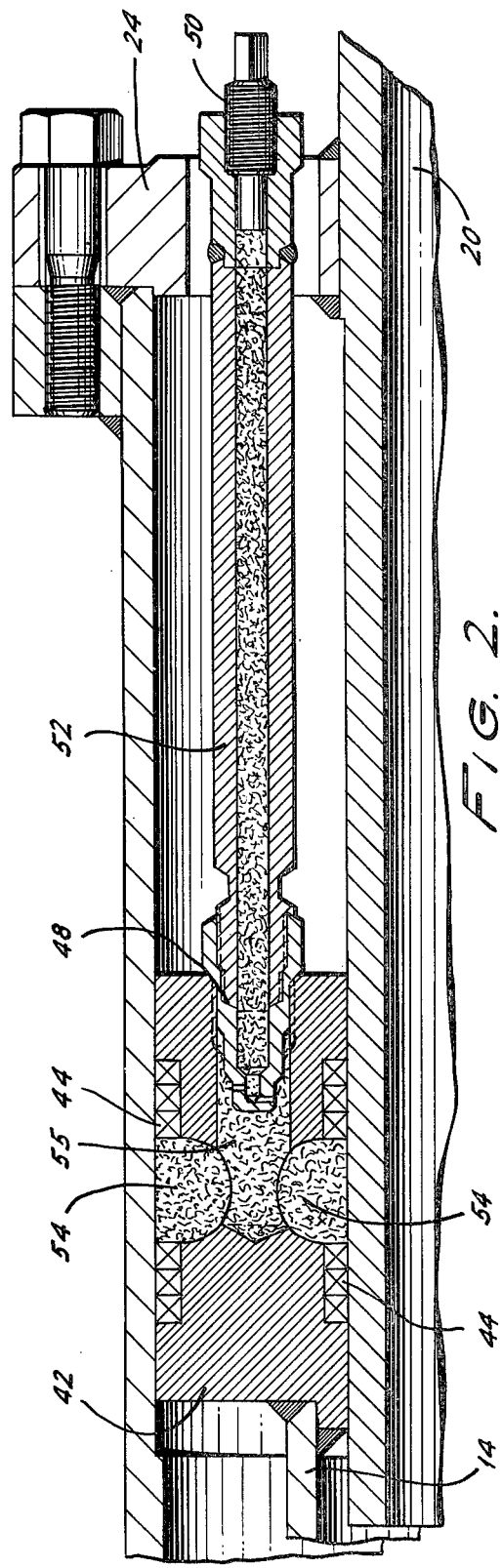

PRESSURE COMPENSATED EXPANSION JOINT

This invention relates to expansion joints for tubular members and, more particularly, to pressure compensating expansion joints particularly useful between sections of a pipe in which fluids under relatively high pressures are carried.

When utilizing pipe systems to transport fluids, particularly those at high temperatures, it is usual to provide an expansion joint between pipe sections to accommodate thermal expansion and contraction of the system caused by the temperature fluctuations of the fluid. In such systems, the internal fluid pressure acts across the cross-sectional area of the pipe to produce forces tending to separate the pipes and these separation forces react through the expansion joint. Various support arrangements can be provided to anchor the pipes, but depending on the location of the pipe system, these support arrangements are not always usable. In addition, these support arrangements can be relatively expensive increasing the cost of the pipe system.

To obviate these problems certain attempts have been made to provide a pressure compensated expansion joint, that is, one that counteracts the internal separation forces exerted on the pipe system. Some of these pressure compensated expansion joints have included bellows arrangements and others have included slip joint arrangements, that is, arrangements wherein the pipes are allowed to slip relative to one another with a pressure compensating system built into the joint. The bellows arrangements have limited utility, not being suitable when the pressure and, thus, the separation forces are relatively high. The slip joint arrangements have been rather complex and expensive apparatus utilizing a large number of seal means. Thus, the slip joint arrangements have not been entirely satisfactory.

Accordingly, it is an object of this invention to provide a pressure compensated expansion joint usable with a wide range of fluid pressures including relatively high pressures.

It is another object of this invention to provide a pressure compensated expansion joint of the slip joint type that utilizes a minimal number of packing arrangements to minimize leakage problems.

It is still another object of this invention to provide a pressure compensated expansion joint of the slip joint type wherein all of the packing means are relatively accessible so that they can be repacked without disassembling the joint or interrupting fluid flow in the pipe system.

Finally, it is an object of this invention to provide a pressure compensating expansion joint that is relatively simple, economical and maintenance free.

These and other objects of this invention are accomplished by providing a pressure compensated expansion joint assembly including a first sleeve member having a slightly enlarged diameter portion at one end thereof and a second sleeve member having one end thereof telescopically received within the enlarged diameter portion such that the first and second sleeve members are movable between expanded and contracted positions. Also included is a third sleeve member fixed to the outer periphery of the second sleeve member and extending axially about the enlarged diameter portion and a portion of the smaller diameter portion of the first sleeve member. The third sleeve member is radially spaced from the first sleeve member whereby a pressure chamber is formed. Ports are formed in the enlarged diameter portion whereby fluid can flow into the pressure chamber and exert forces that counteract separation forces acting on the pipe system. First packing means is carried on the end of the third sleeve member adjacent the first sleeve member and is in sealing engagement with the smaller diameter portion of the first sleeve member; second packing means is carried on the free end of the enlarged diameter portion of the first sleeve member and is located between the second and third sleeve members being in sealing engagement between these last mentioned sleeve members. The second packing means includes a gland in which plastic packing means is received.

Extending from the gland is a plurality of fitting means each including a filler tube extending axially between the second and third sleeve members. The filler tubes terminate beyond the third sleeve member such that they are accessible for repacking the gland in any position of the first and second sleeve members.

To accommodate the sliding movement of the sleeve members and the filler tubes, the third sleeve member is attached to the second sleeve member through a ring member provided with holes through which the filler tubes can freely pass.

For a better understanding the the principles of the invention, reference is made to the following description of a preferred embodiment thereof along with the accompanying drawing in which:

FIG. 1 is a partial section view of a pressure compensating expansion joint in accordance with this invention; and, FIG. 2 is an enlarged sectional view of a packing means usable with the pressure compensating expansion joint illustrated in FIG. 1.

Referring specifically to the drawing, there is illustrated a pressure compensating expansion joint 10 adapted to be located between the adjacent ends of axially aligned pipe sections (not shown) in a piping system carrying a pressurized fluid. As should be understood, fluids at high pressure and temperatures, for example, steam, cause expansion and contraction of the pipes in the piping system and also develop relatively large separation forces at the pipe joint. In accordance with this invention the expansion joint 10 allows for the expansion and contraction of the pipes while it is also arranged to counteract and compensate for the separation force on each pipe section. Included in the joint 10 is a first sleeve member 12 having a slightly enlarged diameter portion 14 located at one end and a flange 16 located at the other end. The flange 16 is used to secure the sleeve member 12 to a pipe section, but it should be understood that other connection means can be utilized, for example, the end of the sleeve could be welded to the pipe section. A plurality of radial ports 18 are formed in the enlarged diameter portion for a purpose to be explained hereinafter.

Also included in the joint 10 is a second sleeve member 20 having a flange 22 at one end for attachment to a pipe member in a manner similar to the first sleeve member. The diameter of the second sleeve member 20 is substantially constant and equal to that of the smaller diameter portion of the first sleeve member 12 so that the other end of the second sleeve member is telescopically received within the enlarged diameter portion 14 of the first sleeve member. Thus, the first and second sleeve members are slideable relative to one another between expanded and contracted positions. In the drawing, the expanded position is illustrated so that sleeve members are movable toward each other.

Welded to the outer surface of the second sleeve member 20 is a ring member 24 extending radially outwardly from the surface of the sleeve member. The ring member 24 can be located at about the midpoint of the sleeve member 20 with the axial length on each side equalling the travel between the expanded and contracted positions of the first and second sleeve members, 12 and 20, respectively.

Attached to the outer periphery of the ring member 24 is a third sleeve member 26 which extends away from the ring member toward and around the first sleeve member 12 and which terminates adjacent the smaller diameter portion adjacent the enlarged diameter portion 14. The third sleeve member is radially spaced from the first sleeve member and forms a portion of a pressure chamber 28, the purpose of which will be explained hereinafter. In order to close the pressure chamber 28, the sleeve member 26 is provided with a radially inwardly extending wall 30 which extends from the third sleeve member toward the first sleeve member and the free end of the enlarged diameter portion 14 carries a portion of a packing gland as will be explained hereinafter.

Extending axially and outwardly from the wall member 30 is a gland 32 forming part of a first packing means. The gland 32 is in engagement with the outer surface of the smaller diameter portion of the first sleeve member 12 and includes a first recessed portion in which a coil type packing 34 is received and a second recessed portion in which a fibrous plastic packing 36 is received. Plastic packings of this type are generally known in the art and can comprise asbestos fiber with solid and liquid lubricant in the form of a plug. Communicating with the second recessed portion are a plurality of fittings each in the form of a barrel portion 38 and a plunger 40. The barrel portion includes a narrow slot at the end received in the recessed portion a thread form at its other end which cooperates with a thread form on the plunger 40. In use, a plug of plastic packing material 36 is inserted in barrel portion 38 and the plunger 40 is utilized to force the plug packing 36 into its recess through the narrow slot formed at the lower end of the barrel. The exact nature of the plug packing 36, barrel 38 and plunger 40 are generally conventional and are more clearly described in U.S. Pat. No. 2,840,112 issued June 24, 1958 to D. R. Yarnall et al. With the arrangement just described, the gland 32 guides the movement of the sleeve members 12 and 20 relative to each other and, of course, seals the joint between the third sleeve member 26 and the first sleeve member 12 allowing replacement of the plug packing material without disassembling the joint or interrupting the flow of fluid in the pipe system. If desired, suitable lubrication fittings, not shown, can be associated with the gland for adding lubrication.

At the free end of the enlarged diameter portion 14 is secured another gland 42 which extends between the second and third sleeve members 20 and 26, respectively. In this way, the innermost face of the gland 42 forms a part of the pressure chamber 28. Somewhat similar to the gland 32, the gland 42 is formed with a first pair of recessed portions adjacent its inner and outer end surfaces. Each of the recessed portions receives a coil type packing 44. A second pair of recessed portions are formed between each recessed portion in the first pair and these recessed portions are radially spaced apart. Each recessed portion in the second pair receives a fibrous plastic packing 54 similar to the packing 36. Communicating with the recessed portions in the second pair are a plurality of circumferentially spaced openings 55, each filled with the plastic packing and each associated with a fitting in the form of a barrel portion 48, a plunger 50 and a generally cylindrical filler tube 52 between the barrel portion and the plunger. The barrel portion 48 communicates with the openings 55 in the second recessed portions of the gland 42 through a narrow slot arrangement and communicates with the cylindrical filler tube 52 which extends axially between the second and third sleeve members, 20 and 26, respectively. The other end of the filler tube 52 is formed with a thread form which cooperates with a threaded form on the plunger 50 for inserting a plastic packing material 54 through the filler tube and the barrel portion into the second recess portion. The length of the filler tube in the axial direction is sufficiently long so that the filler tube extends beyond the ring member 24 in the expanded position of the sleeve members 12 and 20 so that it is accessible to the outside for repacking the gland without removing the joint assembly or interrupting the flow of fluid flow in the pipe system. The ring member 24 is formed with suitable openings through which the filler tubes 52 and plungers 50 freely fit so that as the sleeve members contract, these portions of the fittings move toward the flange 22. Thus, in any position of the expansion joint 10, the plungers 50 are accessible for repacking the joint. In other words, the axial length of the filler tubes 52 is generally equal to the predetermined distance between the expanded and contracted positions of the first and second sleeve members 12 and 20, respectively.

As should be obvious, the expansion joint 10 is arranged such that the first and second sleeve members 12 and 20, respectively, are slideable relative to each other to accommodate thermal expansion and contraction and relative movement between the pipe sections to be connected. The separation forces in the pipe system are offset by the fluid pressure in the pressure chamber 28 which approximately equals that in the pipe. Since the outer third sleeve member 26 is fixed to the second sleeve member 20, the pressure acting on the inside of the radial wall 30 offsets the force tending to pull the second sleeve member 20 and its associated pipe section away from the first sleeve member 12 and its associated pipe section. Similarly, the pressure acting on the inside of the gland 42 which is attached to the first sleeve member 12 offsets the force tending to pull the first sleeve member 12 and its associated pipe section. Since the pressure in the pressure chamber 28 is substantially equal to the pressure in a pipeline, by making the areas of the wall 30 and the inner surface of the gland 42 approximately equal to the area of the pipes, the forces tending to separate the pipes are substantially counterbalanced by the forces acting in the pressure chamber 28. At this point it is noted that a drain plug 56 can be located in the third sleeve member 26 so that, if necessary, the pressure chamber can be drained of fluid.

While in the foregoing a preferred embodiment of the invention has been disclosed, it should be obvious to those skilled in the art that various changes and modifications can be made within the scope of the appended claims.

I claim:

1. A pressure compensated expansion joint assembly including a first sleeve member having an enlarged diameter portion at one end thereof, a second sleeve member having one end thereof telescopically received within said enlarged diameter portion such that said first and second sleeve members are movable between expanded and contracted positions, a third sleeve member fixed to said second sleeve member and extending axially about said enlarged diameter portion and a portion of the smaller diameter portion of said first sleeve member, said third sleeve member being radially spaced from said first sleeve member whereby a pressure chamber is formed therebetween, ports formed in said enlarged diameter portion whereby fluid in said first and second sleeve member can flow into said pressure chamber exerting forces that counteract separation forces acting on an associated pipeline, first packing means carried on the end of third sleeve member adjacent said first sleeve member, said first packing means being in sealing engagement with the smaller diameter portion of said first sleeve member, second packing means carried on the free end of said enlarged diameter portion between said second and third sleeve members, said second packing means having integral plastic packing material and being in sealing engagement between said second and third sleeve members and also between said first and second sleeve members.

2. A pressure compensated expansion joint assembly in accordance with claim 1 wherein said second packing means includes fitting means in communication therewith, said fitting means extending axially between said second and third sleeve members and terminating beyond said third sleeve member whereby it is accessible.

3. A pressure compensated expansion joint in accordance with claim 1 wherein said second packing means includes a gland in which plastic packing means is received and wherein a plurality of fitting means communicate with said gland, each of said fitting means including a filler tube extending axially between said second and third sleeve members and terminate beyond said third sleeve member such that the free end of said filler tubes are accessible.

4. A pressure compensated expansion joint in accordance with claim 3 wherein said first packing means includes a gland in which plastic packing means is received and wherein a plurality of fittings communicate with said gland.

5. A pressure compensated expansion joint in accordance with claim 3 wherein a ring is fixed to the outer surface of said second sleeve member and wherein said third sleeve member is fixed to the outer periphery thereof, said ring member being formed with openings through which said filler tube can slide.

6. A pressure compensated expansion joint in accordance with claim 3 wherein the distance between said expanded and contracted positions of said first and second sleeve members is predetermined and wherein the axial length of said filler tubes is generally equal to said predetermined distance.

* * * * *